(No Model.)
C. F. HADLEY & A. H. OVERMAN.
VELOCIPEDE.
No. 292,908. Patented Feb. 5, 1884.
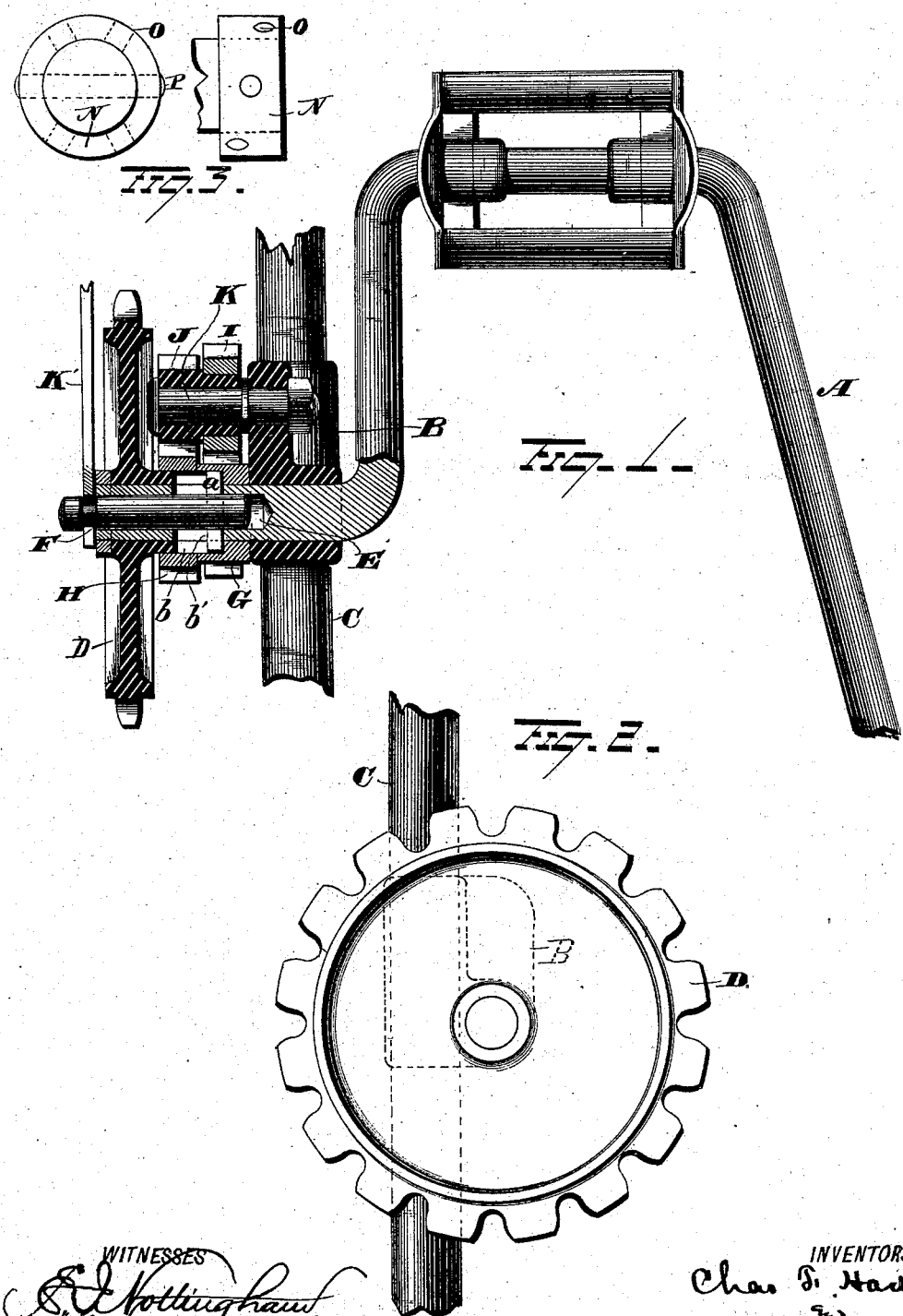

UNITED STATES PATENT OFFICE.

CHARLES F. HADLEY, OF CHICOPEE, MASSACHUSETTS, AND ALBERT H. OVERMAN, OF HARTFORD, CONNECTICUT, ASSIGNORS TO THE OVERMAN WHEEL COMPANY, OF HARTFORD, CONNECTICUT.

VELOCIPEDE.

SPECIFICATION forming part of Letters Patent No. 292,908, dated February 5, 1884.

Application filed February 28, 1883. (No model.)

*To all whom it may concern:*

Be it known that we, CHARLES F. HADLEY, of Chicopee, in the county of Hampden and State of Massachusetts, and ALBERT H. OVER-MAN, of Hartford, in the county of Hartford and State of Connecticut, have invented certain new and useful Improvements in Tricycles; and we do hereby declare the following to be a full, clear, and exact description of the invention, such as will enable others skilled in the art to which it pertains to make and use the same.

Our invention relates to an improvement in velocipedes, the object of the same being to provide means whereby the difficulties experienced in propelling velocipedes up steep inclines and on heavy roads may be more or less overcome; and with these ends in view our invention consists in the parts and combination of parts, as will be more fully described, and pointed out in the claims.

In the accompanying drawings, Figure 1 represents the pedal-shaft in elevation and the chain-wheel and intermediate parts in section. Fig. 2 is a view in elevation of the chain-wheel, and Fig. 3 is a detached view of the collars which hold the pedals in position.

A represents the pedal-shaft, the opposite ends of which are journaled in the bearings B, rigidly secured to the arms C of the forks. The end of the pedal-shaft A, to which the sprocket or chain wheel D is journaled, is hollowed out or provided with an elongated cavity, E, in which the sliding pin F rests and moves. This pin F is provided with a feather, *a*, projecting at both sides therefrom, which latter moves in oblong slots formed on opposite sides of the pedal-shaft. The ends of the feather *a* are adapted to engage with the drive-wheel G, and rigidly hold it on the pedal-shaft, or with the chain-wheel D, and rigidly secure it to the shaft. The chain-wheel D, which transmits motion to the large ground-wheels through the intervention of an endless chain, is loosely journaled on the pedal-shaft, and is provided on its inner face with a small pinion, H, formed integral therewith or shrunk on the hub thereof, as desired. This wheel H is provided on its inner face with one or a series of slots, *b*, in which the feather *a* moves to rigidly connect the chain-wheel D to the pedal-shaft. The smaller pinion G, which is also loosely journaled on the pedal-shaft A, is provided with one or a series of slots, *b'*, in which the feather *a* rests to rigidly secure it to the shaft A. Thus it will be seen that when the pin F is moved inwardly the motion of the shaft is transmitted to the chain-wheel through the wheel G. This wheel G, which is smaller than the wheel H, is in direct communication with a pinion, I, formed integral with or shrunk on a hub of the pinion J, the two wheels I and J being journaled on a common bearing, K, which is rigidly secured to the bearing B. The pinion J is slightly smaller than the pinion I, and is in direct communication with the pinion H, rigidly secured to the chain-wheel D. The pin F is operated by a lever, K, the lower end of which is loosely secured to the outer end of the pin, while the upper end terminates in close proximity to the driver, whereby he is enabled to change the speed of the machine without leaving his seat. When traveling up steep inclines or on heavy roads, the pin F is thrust inwardly, and by means of the feather *a* rigidly secures the wheel G to the pedal-shaft, and leaves the chain-wheel D loose thereon. As the pedal-shaft is turned the motion thereof is transmitted to the wheel I, and from thence to the wheel J, which latter turns the chain-wheel through the intervention of the wheel H. When traveling on level roads, the pin F is drawn outwardly, and the feather *a*, engaging with the wheel H, locks the chain-wheel directly in the pedal-shaft, and consequently causes the said wheel to travel simultaneously therewith, and at the same rate of speed. When the chain-wheel D is in direct engagement with the pedal-shaft, the wheel G is loose, and free to revolve thereon at a different rate of speed. When the chain-wheel D is locked directly to the pedal-shaft, it revolves simultaneously therewith at the same rate of speed; but when motion is transmitted thereto through the pinions G, I, J, and H an increase of power is obtained with a proportionate decrease of speed. If drive or chain wheels are secured to the opposite ends of the pedal-shafts, it will be necessary to employ the changeable gears in connection with both wheels; but where only one wheel is employed only one set of gears is required.

N are metallic collars secured to the pedal-shaft inside or between the pedals, for the purpose of holding the latter in position and also to prevent them from wabbling. The pedal-shaft is provided with suitable holes, and the collars N are each provided with any suitable number of holes or perforations, O, adapted to register with the holes in the pedal-shaft for the passage of the tapering pin P, which holds the collars in position. The series of holes O in the collars m are arranged as shown in Fig. 3, so as to enable the collars to be moved nearer the ends of the pedals, when either the pedals or collars wear away.

To adjust the collars m, it is simply necessary to remove the pin or pins P and slide the collar or collars outward the necessary distance, and again secure it or them by inserting the pins in the next hole.

The above description of parts applies to tricycles, but the principle of the same may be modified to suit ordinary bicycles.

Our improvement is simple in construction, is of few parts, is durable and effective in use, and can be applied to velocipedes without materially increasing their cost.

It is evident that slight changes in the construction and relative arrangement of the several parts might be resorted to without departing from the spirit of our invention, and hence we would have it understood that we do not limit ourselves to the exact construction shown, but consider ourselves at liberty to make such changes and alterations as fairly fall within the spirit and scope of our invention.

Having fully described our invention, what we claim as new, and desire to secure by Letters Patent, is—

1. In a velocipede, the combination, with the pedal-shaft and a chain-wheel loosely secured thereon, having an interiorly-slotted pinion rigidly secured to it, of the independent sliding locking device adapted to engage the slotted pinion, and means for actuating said device, whereby the said chain-wheel is thrown out of and into connection with the shaft.

2. In a velocipede, the combination, with a slotted pedal-shaft and a chain-wheel loosely mounted thereon, of a locking-pin arranged within said shaft, a pinion loosely mounted on said shaft, and gearing interposed between said chain-wheel and the bearing of the shaft, substantially as set forth.

3. In a velocipede, the combination, with the pedal-shaft and a chain-wheel loosely mounted thereon, of the gearing, the locking-pin, and the means for actuating the said pin, whereby the said wheel may be directly connected with said shaft to turn therewith or indirectly connected with the shaft, substantially as set forth.

4. The combination, with the pedal-shaft provided with a hollowed or socketed end, a pin resting in said socketed end and provided with a feather, and means for moving the pin longitudinally, of a chain-wheel loosely journaled on the shaft, a pinion rigidly secured to the chain-wheel, a pinion loosely journaled on the shaft, and intermediate gears connecting the wheel on the shaft and the wheel on the chain-wheel.

5. The combination, with the pedal-shaft having a hollowed or socketed end, a feathered pin working in said slot, and a lever for moving the pin, of a chain-wheel loosely secured on the shaft, a slotted pinion rigidly secured to the chain-wheel and surrounding the shaft, a slotted pinion loosely journaled on the shaft, and two gear-wheels rigidly secured together and adapted to mesh, respectively, with the loose pinion on the shaft and the rigid pinion on the chain-wheel, substantially as set forth.

6. The combination, with the shaft A and bearing B, of the chain-wheel D, feathered pin F, and the pinions G I J H, all of the above parts combined and adapted to operate as described.

7. The combination, with the pedal-shaft having holes and the pedals fitted thereon, of collars having corresponding holes and pins or equivalent devices for connecting them with the shaft for securing the pedals, said collars being adapted to be adjusted to compensate for the wear, substantially as set forth.

In testimony whereof we have signed this specification in the presence of two subscribing witnesses.

CHARLES F. HADLEY.
ALBERT H. OVERMAN.

Witnesses:
J. P. KELLY,
LUTHER WHITE.